July 21, 1970
C. SAN PIETRO
3,521,338
AUTOMATIC MACHINE FOR WINDING PLASTIC FILM CAPACITORS
Filed Feb. 28, 1967
11 Sheets-Sheet 1
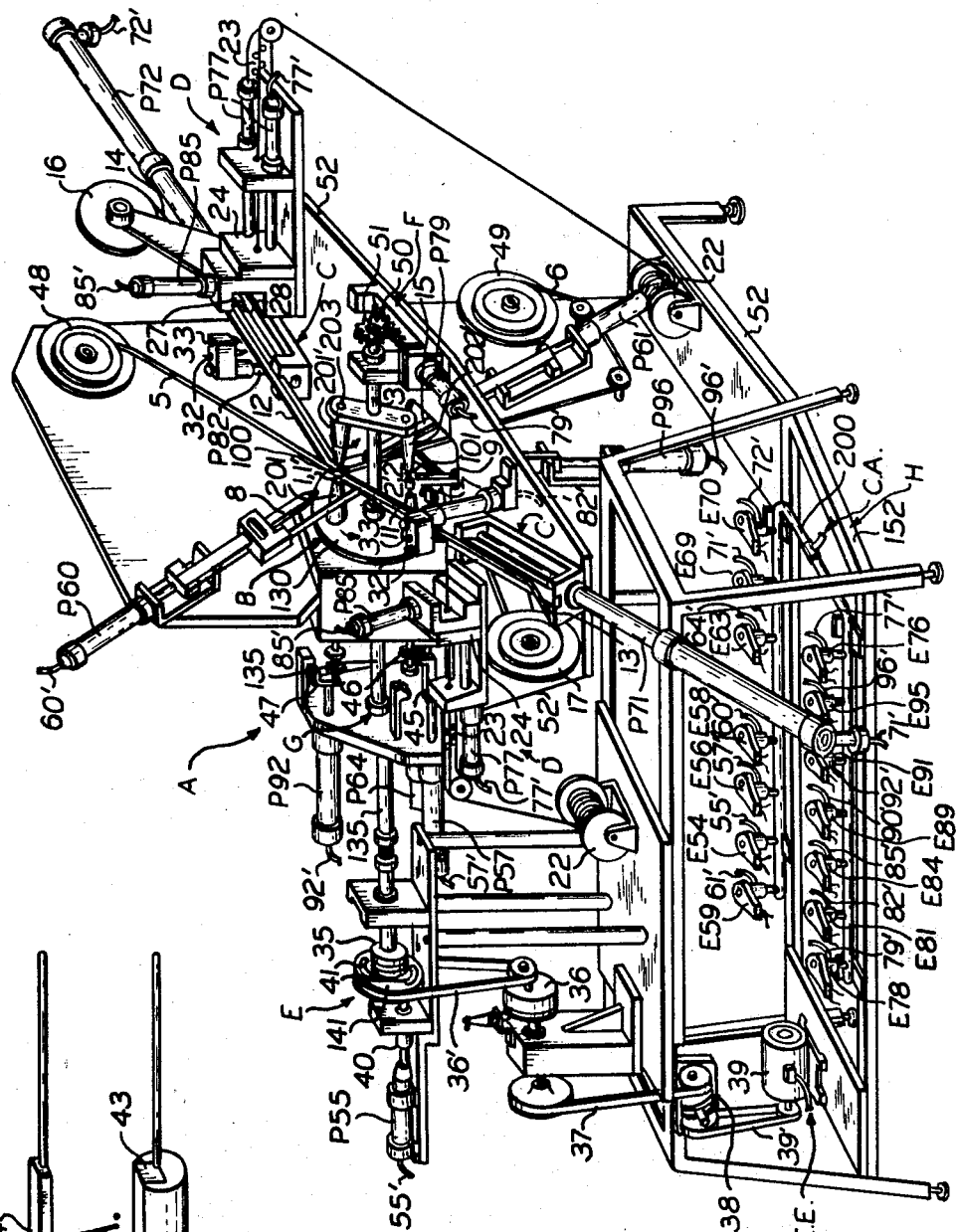
INVENTOR
CARLO SAN PIETRO
BY
ATTORNEYS.

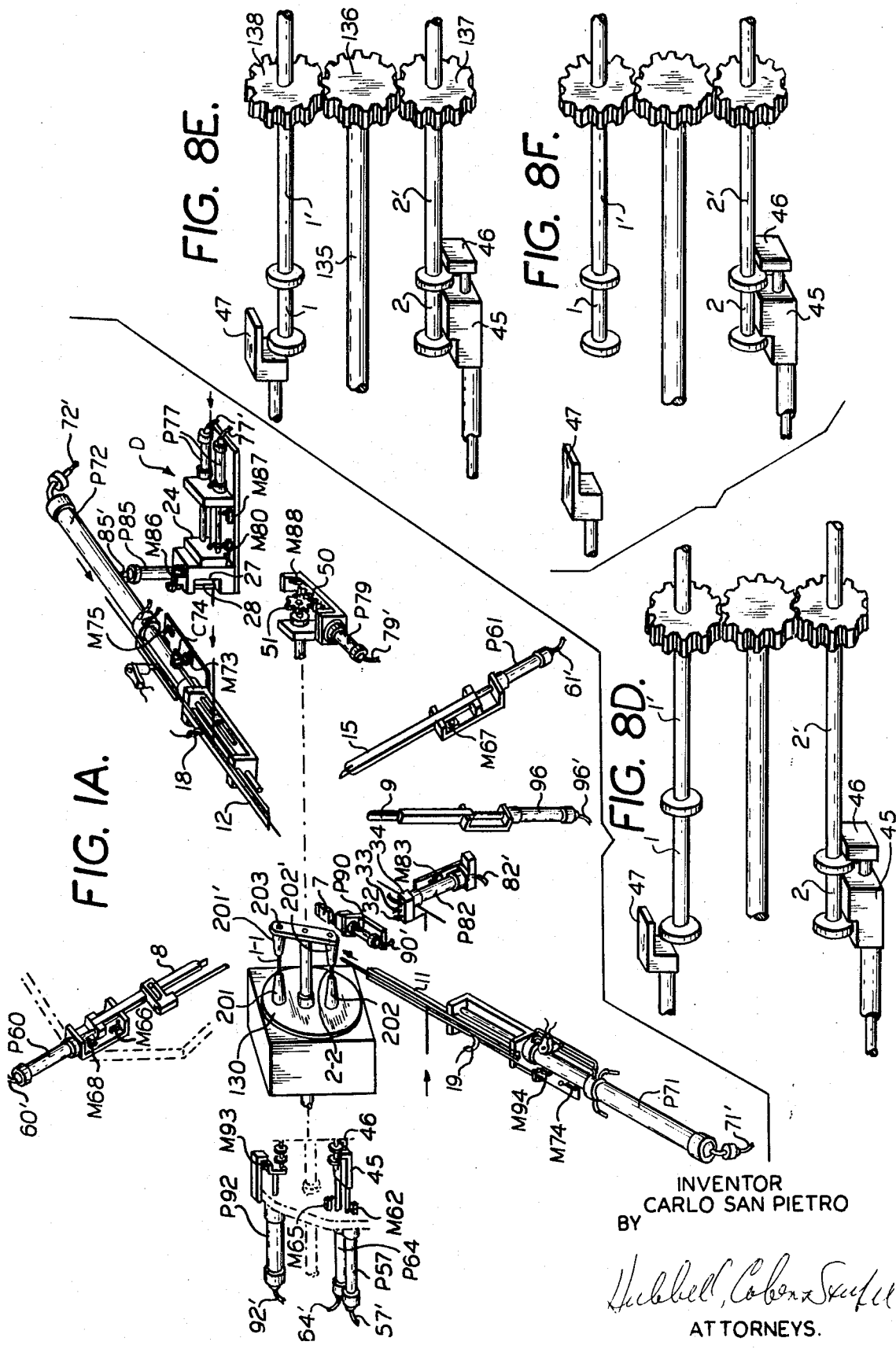

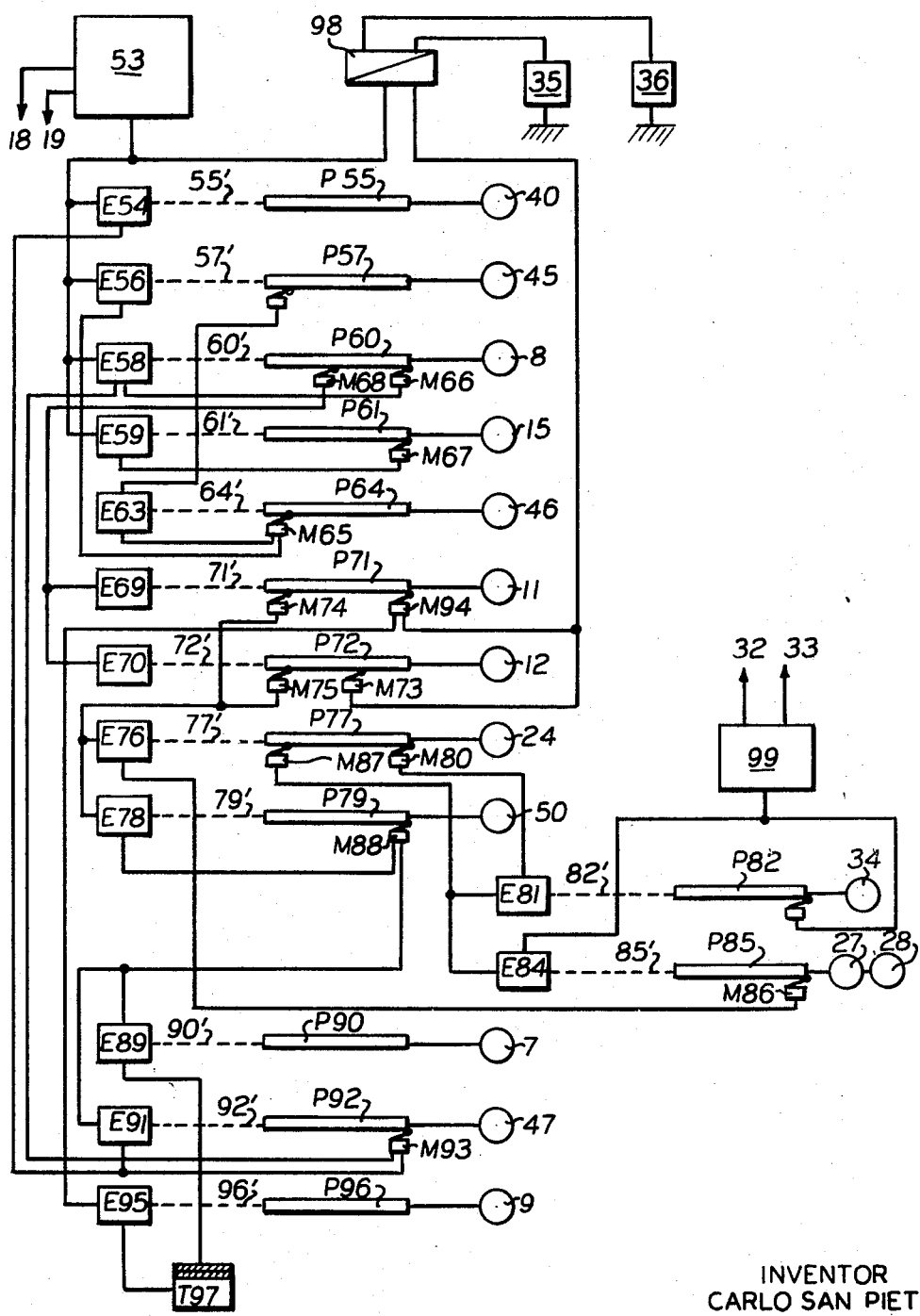
FIG. IB.
INVENTOR
CARLO SAN PIETRO

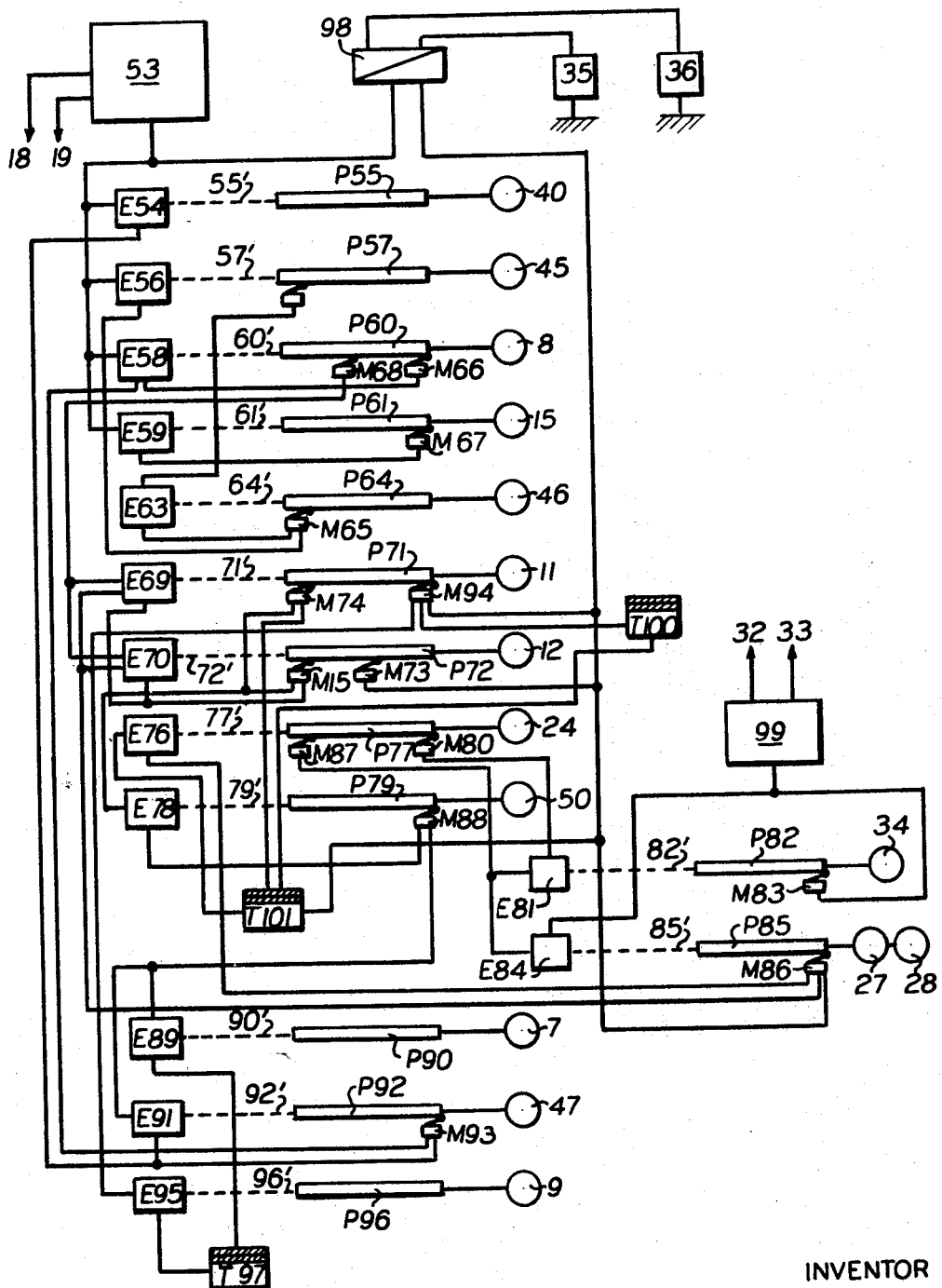
FIG IC.

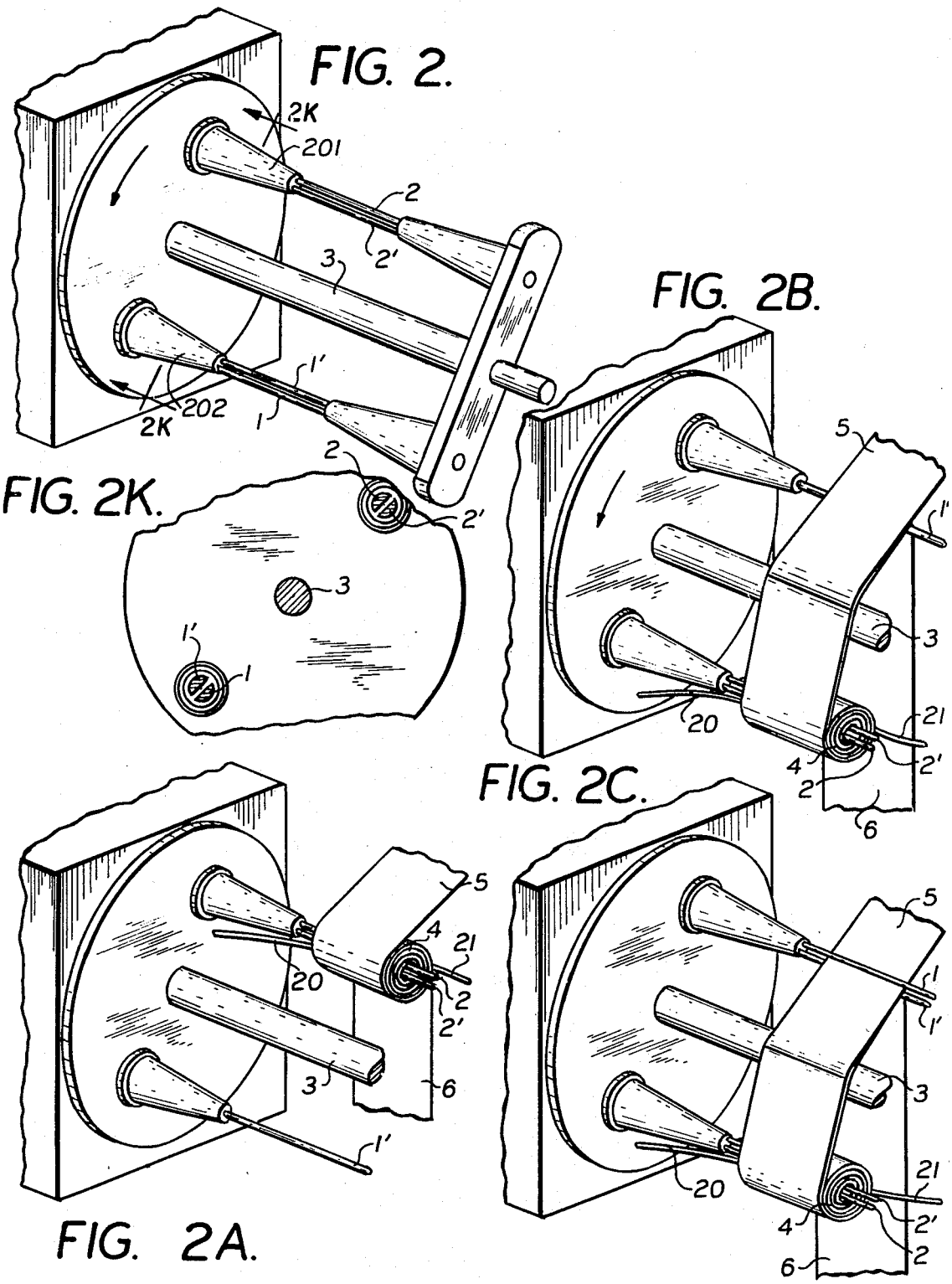

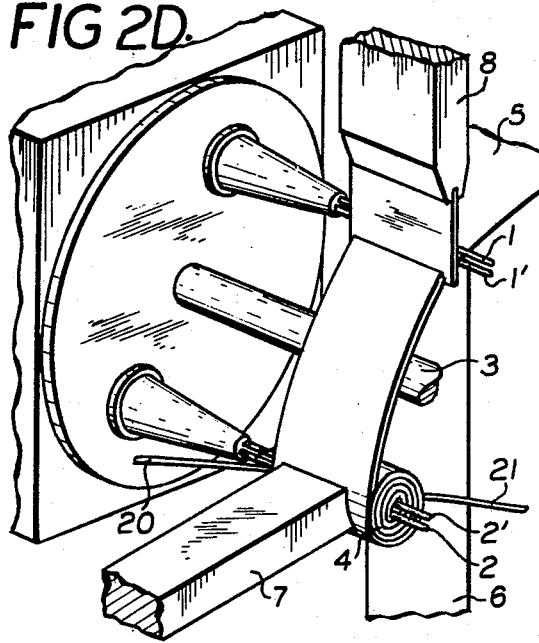
FIG 2D.
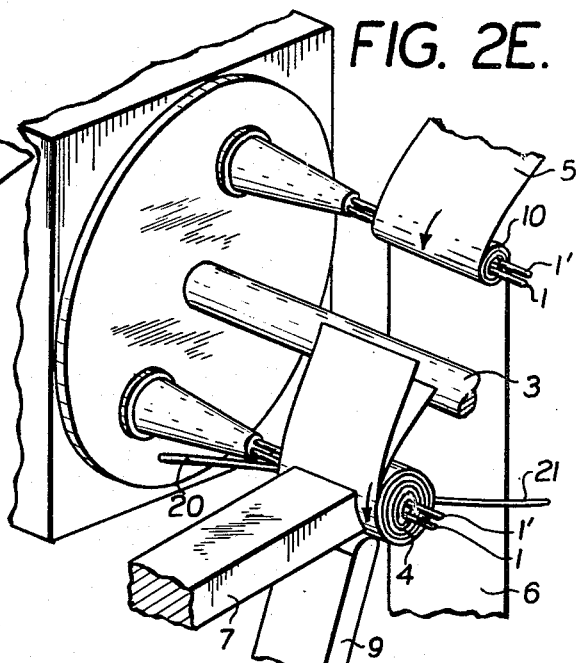
FIG. 2E.
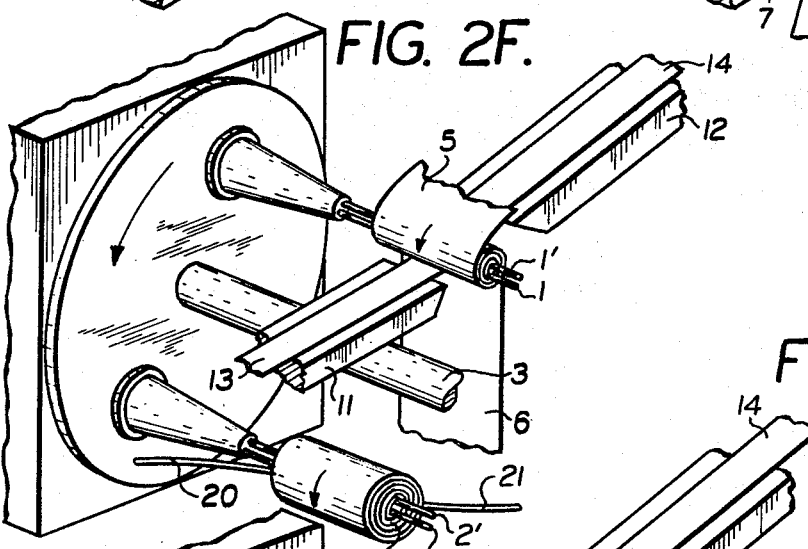
FIG. 2F.
FIG. 2G.
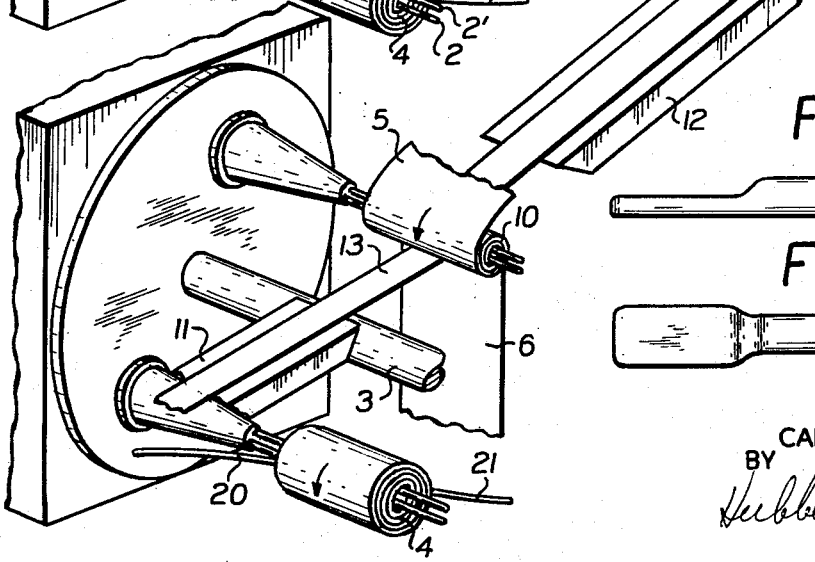
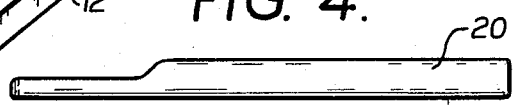
FIG. 4.
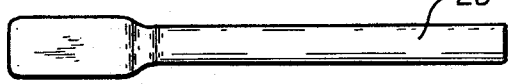
FIG. 4A.
INVENTOR
CARLO SAN PIETRO
BY
ATTORNEYS.

July 21, 1970 C. SAN PIETRO 3,521,338
AUTOMATIC MACHINE FOR WINDING PLASTIC FILM CAPACITORS
Filed Feb. 28, 1967 11 Sheets-Sheet 8

INVENTOR
CARLO SAN PIETRO
BY
ATTORNEYS.

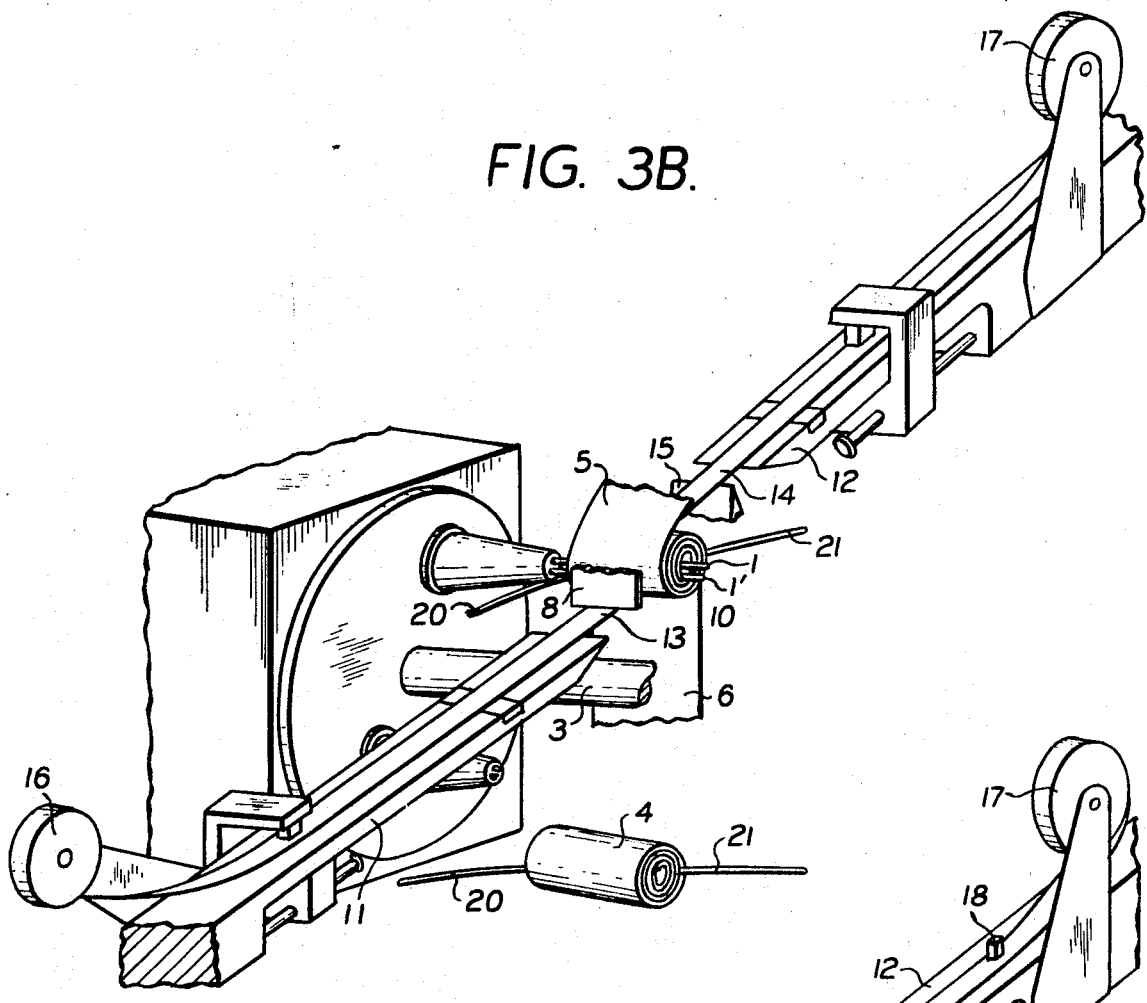
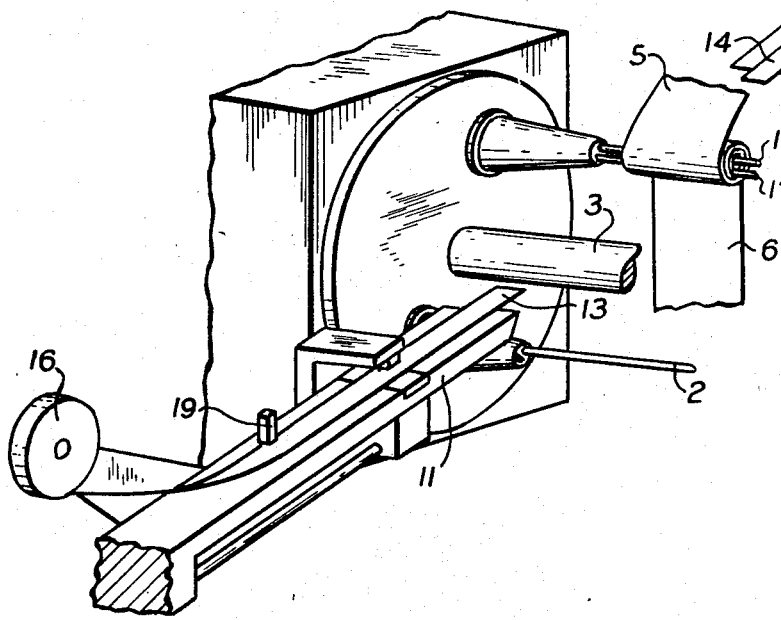

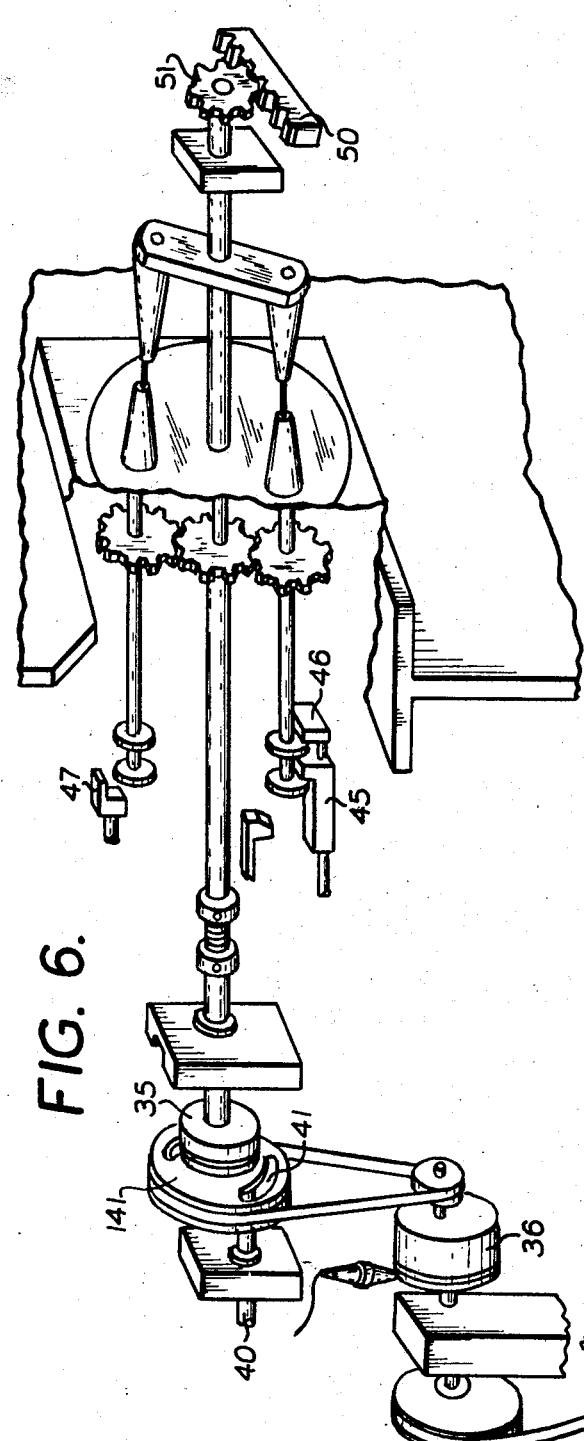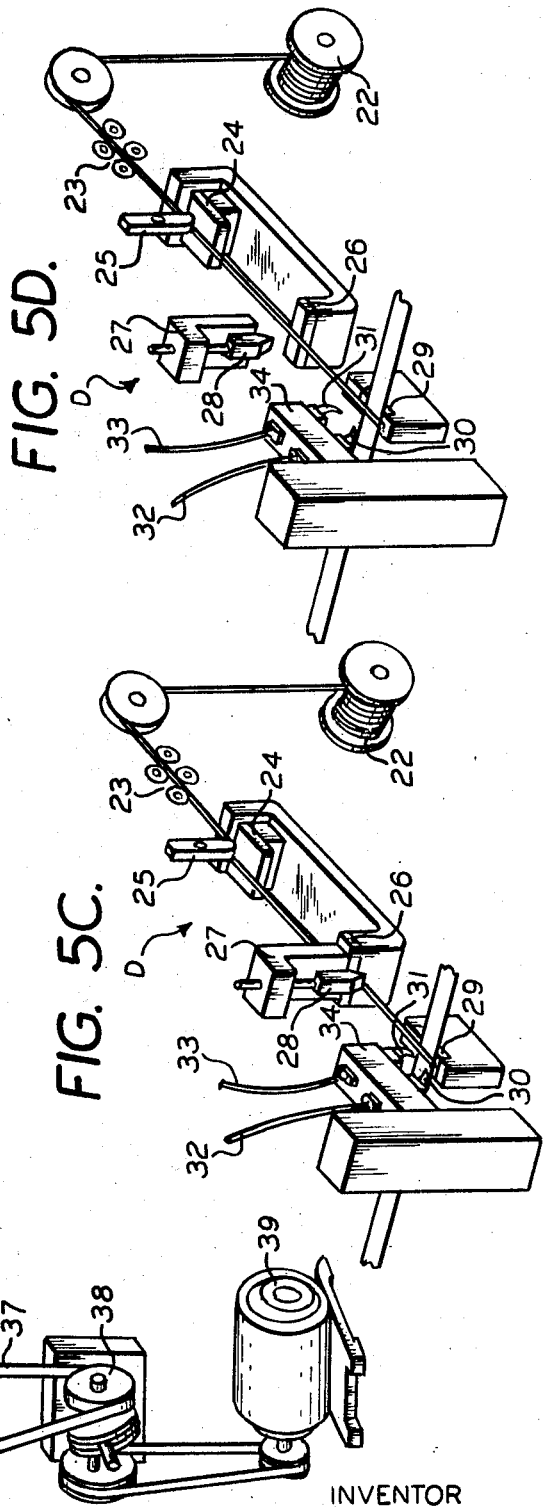

INVENTOR
CARLO SAN PIETRO

ATTORNEYS.

United States Patent Office 3,521,338
Patented July 21, 1970

3,521,338
AUTOMATIC MACHINE FOR WINDING PLASTIC FILM CAPACITORS
Carlo San Pietro, Milan, Italy, assignor to Mial S.p.A., Milan, Italy
Filed Feb. 28, 1967, Ser. No. 619,448
Claims priority, application Italy, Mar. 4, 1966, 4,890/66
Int. Cl. H01g *13/00*
U.S. Cl. 29—25.42         6 Claims

ABSTRACT OF THE DISCLOSURE

A capacitor winding machine having a rotatable turret on which are slidably and rotatably mounted two pair of semi-mandrels on which capacitors are wound. Automatic means are included for feeding foil bands in interleaved relation with dielectric bands to form the capacitors, and automatic means for forming terminals from wire and for welding terminals to the foil are provided.

BACKGROUND OF THE INVENTION

Field of the invention

The present invention relates to a machine for automatically making capacitors which include a pair of wound dielectric bands with a pair of wound foil bands interleaved therein.

SUMMARY OF THE INVENTION

The machine includes a rotatable turret from which extend two pairs of semi-mandrels that are disposed on the turret symmetrical with regard to its axis of rotation. Each of the semi-mandrels is retractable and extendable on the turret. The semi-mandrels occupy two positions in accordance with the turret position—an upper position and a lower or inferior position. A pair of dielectric bands are caught between the two semi-mandrels in the upper position and the semi-mandrels are then rotated about their joint longitudinal axis to wind the dielectric bands about the semi-mandrel pair. Shortly after the winding is started two foil band carriages move close to the upper semi-mandrels and introduce in interleaved relation with the dielectric bands two foil bands which are thereafter wound on the mandrel along with the dielectric bands.

When the capacitor being formed on the upper pair of semi-mandrels achieves the desired amount of capacitance the mandrel rotation stops, and the turret is rotated 180° so as to introduce the dielectric bands between the other pair of semi-mandrels that have now been moved to the upper position. The dielectric bands are then cut to free them from the wound capacitor and the wound capacitor is sealed by a retractable heat sealing element. After sealing, both of the semi-mandrels in the now lower position are retracted to discharge the completed capacitor.

Means may be provided for automatically forming terminals and for welding those terminals to the foil bands prior to the incorporation of the foil band into a wound capacitor.

BRIEF DESCRIPTION OF THE DRAWINGS

FIG. 1 is a perspective view of a machine embodying the prevent invention;
FIG. 1A is a view similar to FIG. 1 with the base and other parts of the machine deleted for the purpose of clarity of illustration of those parts shown in the drawings;
FIG. 1B is a schematic diagram of the electrical control circuitry for the machine of FIG. 1;

FIG. 1C is a diagram similar to FIG. 1B showing a modified form of control circuitry;
FIGS. 2, 2A, 2B, 2C, 2D, 2E, 2F, 2G, 2H, and 2L are perspective views of the capacitor winding mandrels showing the condition of said mandrels as they pass progressively through their cycle of operation;
FIG. 2K is a sectional view taken along the line 2K—2K in FIG. 2;
FIGS. 3, 3A, 3B and 3C are perspective views of the capacitor winding mandrels in association with the foil feeding carriages, showing various conditions of said carriages as the operation of the machine progresses through its cycle;
FIG. 4 is a side elevational view of a capacitor terminal;
FIG. 4A is a top-plan view of the capacitor terminal;
FIGS. 5, 5A, 5B, 5C, and 5D are all perspective views of the terminal material feeding and forming apparatus showing said apparatus in different conditions as the machine progresses through its cycle of operations;
FIG. 6 is a schematic view of the mandrel rotation and mandrel turret positioning apparatus;
FIG. 7 is a perspective view of the slidable portion of a mandrel holder;
FIG. 7A is a perspective view of an assembled mandrel holder;
FIGS. 8, 8A, 8B, 8C, 8D, 8E and 8F are all perspective views of the mandrel extraction and introduction apparatus, said several figures showing said apparatus in various conditions as the machine of FIG. 1 progresses through its cycle of operations.

DESCRIPTION OF THE PREFERRED EMBODIMENTS

Figure 2H:
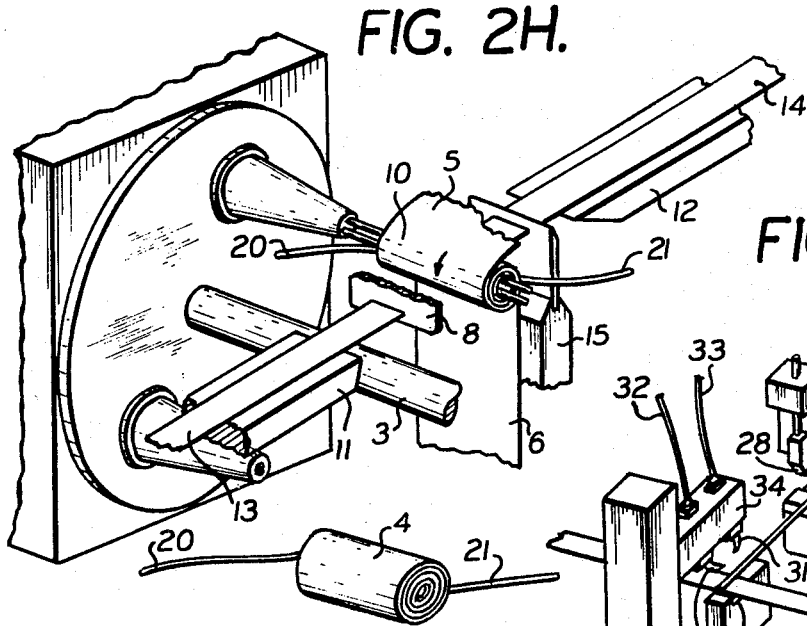

Referring now to the drawings in detail and especially to FIG. 1 thereof the machine embodying the presently preferred form of the invention is generally designated by the reference character A and includes a capacitor winding mandrel group designated by the reference character B, a pair of foil holder and carriage assemblies designated by the reference characters 11 and 12, a pair of terminal material feeding and forming apparatuses designated by the reference character D, a mandrel rotating and positioning means designated by the reference character E, a mandrel turret positioning means designated by the reference numeral F, and mandrel extraction and insertion apparatus designated generally by the reference character G. All of these devices are mounted on a suitable base H and are interrelated by electrical control circuitry to be described hereinafter.

BASE

The base H is preferably formed of metal as by a casting 52, or by fabrication, and is formed to support all of the parts of machine A with the exception of an electric control panel that may be on a separate rack, although it too could be mounted on base H.

CAPACITOR WINDING MANDRELS GROUP B

The capacitor winding mandrels group B, as shown in FIG. 2, is composed of four semi-mandrels 1, and 1', 2, and 2' each shaped as a semi-cylinder haivng a planar surface along the main axis thereof. The semi-mandrels are paired as 1–1' and 2–2' with the planar surfaces of paired semi-mandrels in close confronting relation. The semi-mandrels are cantilevered out from rotatable mounting cones 201 and 202 which are mounted on mandrel turret 130 which in turn is rotatable about a shaft 3. Cones 201 and 202 are symmetrically disposed on turret 130 with regard to shaft 3. The semi-mandrels can be longitudinally extended and extracted, each one independently from the other one, as will be later described and can be stopped in a well defined position which is suitable for the reception of dielectric film bands 5 and 6 in order to start the capacitor winding. The dielectric film bands 5 and 6, which are preferably formed of plastic, are fed to the mandrels group B from reels 48 and 49, respectively, which are rotatably mounted on base H.

The cycle of operation of mandrels group B is as follows:

As shown in FIG. 2A, the semi-mandrels 1 and 1' are in an inferior position, the semi-mandrel 1' is stationary and has the flat part disposed in a plane passing through the axis of the two semi-mandrels 1 and 1' while the semi-mandrel 1 is entirely retracted. The semi-mandrels 2 and 2' that are in the upper position, have completed the winding of a capacitor 4 but are still connected to the two dielectric film bands 5 and 6. Through the movement of the turret positioning group F, as will be described hereinafter, the two semi-mandrels pairs rotate counterclockwise 180° about the pivot 3, changing their respective positions, as shown in FIG. 2B. In this way the semi-mandrels 2 and 2' holding the wound capacitor 4, pull the film bands 5 and 6 which come to lay on the flat surface of semi-mandrel 1' which has now been rotated to the upper position by apparatus F.

As shown in FIG. 2C, the semi-mandrel 1 has been moved to its extended position to hold between itself and the semi-mandrel 1' the two dielectric film bands 5 and 6 in a position suitable for starting the winding of a new capacitor.

As shown in FIG. 2D, a reciprocably movable holding tool 7 has been moved forward to apply a slight pressure on the wound capacitor 4 in order to avoid the unwinding thereof after a reciprocably movable cutting tool 8, that cuts the dielectric films 5 and 6, is moved forward to cut the films. The cutting of films 5 and 6 occurs very shortly after holding tool 7 engages capacitor 4.

The reciprocal movement imparted to the holding tool 7 is effected, as best seen in FIG. 1A, by a pneumatic piston and cylinder P90 mounted on the base H and having the piston thereof connected and supporting the holding tool 7. Compressed air for the piston 90 is supplied through a hose 90' which is controlled by a solenoid valve E89. Cutting tool 8, on the other hand, is carried by the output shaft of the piston of a pneumatic piston and cylinder P60 (FIGS. 1 and 1A) which piston and cylinder P60 is supplied with compressed air through a hose 60' controlled by a solenoid valve E58.

Upon dielectric films 5 and 6 being cut as shown in FIG. 2E, the mandrels 1–1' and 2–2' begin their counterclockwise rotation about their respective axes, which rotation is imparted through mandrel cones 201 and 202 by means E in a manner to be described hereinafter. Thus, on the upper semi-mandrels 1–1', the winding of a capacitor core 10 starts contemperaneously, a reciprocably movable sealing tool 9 is moved by its piston-cylinder P96 into contact with wound capacitor 4 which is mounted on and rotating with the lower semi-mandrels 2–2'. This tool 9 is heated to a convenient temperature for sealing the outer dielectric film layers on the body of the wound capacitor 4.

After capacitor 4 is sealed, the holding and sealing tools 7 and 9 respectively are retracted to their rest positions, while, as shown in FIG. 2F, through the two reciprocably movable foil holder carriages 11 and 12, the aluminium foil bands 13 and 14 which are provided with terminals 20 and 21 are interleaved between dielectric films 5 and 6 for winding therewith to form the capacitor 10. After the foils are introduced, as shown in FIG. 2G, the armature foil holder carriages 11 and 12 are withdrawn. The means for moving and controlling the foil holder carriages 11 and 12 are best shown in FIGS. 1 and 1A and will be described in greater detail hereinafter. Suffice it to say, foils holder 11 is connected to a piston of a piston and cylinder P71 which is supplied with compressed air through a hose 71' from the compressed air source. The hose 71' has interposed therewithin a solenoid valve E69 to control the supply of compressed air. The foil holder carriage 12 is moved by a pneumatic piston and cylinder P72 which is supplied with compressed air through a hose 72' that is connected to a solenoid valve E70 which controls the supply of compressed air into the piston cylinder P72.

Figure 2L:
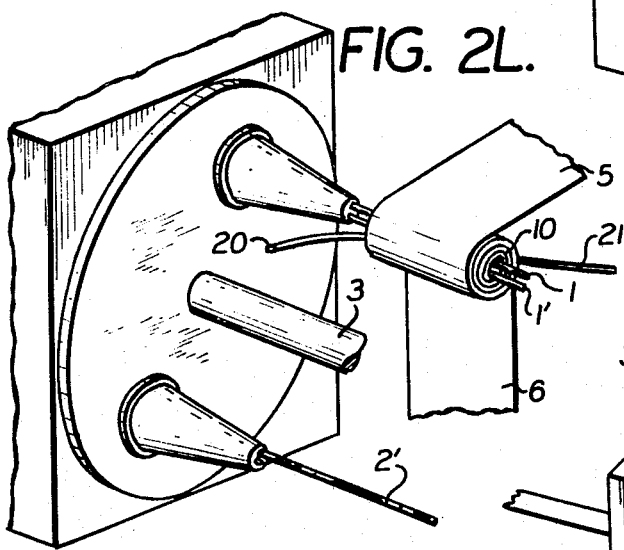

The winding of capacitor 10 continues until the desired capacitance is reached (as determined by a capacitance bridge 53 in a manner to be described subsequently) whereupon the mandrels stop rotating. Then, as shown in FIG. 2H two tools 8 and 15 for the cutting of aluminum foils 13 and 14 are activated through the control circuitry as will later be described. Contemporaneously, the two semi-mandrels 2–2', which are in the lower position, are completely retracted in order to free the capacitor 4 which falls into a collecting container. The semi-mandrels 2 and 2' are immediately reextended to their previous extended positions, the foils holder carriages 11 and 12 are withdrawn and, as shown in FIG. 2L, the entire apparatus is ready to start a new cycle, as has been described above from FIG. 2A.

FOILS HOLDER CARRIAGES GROUPS 11 AND 12

Figure 3:
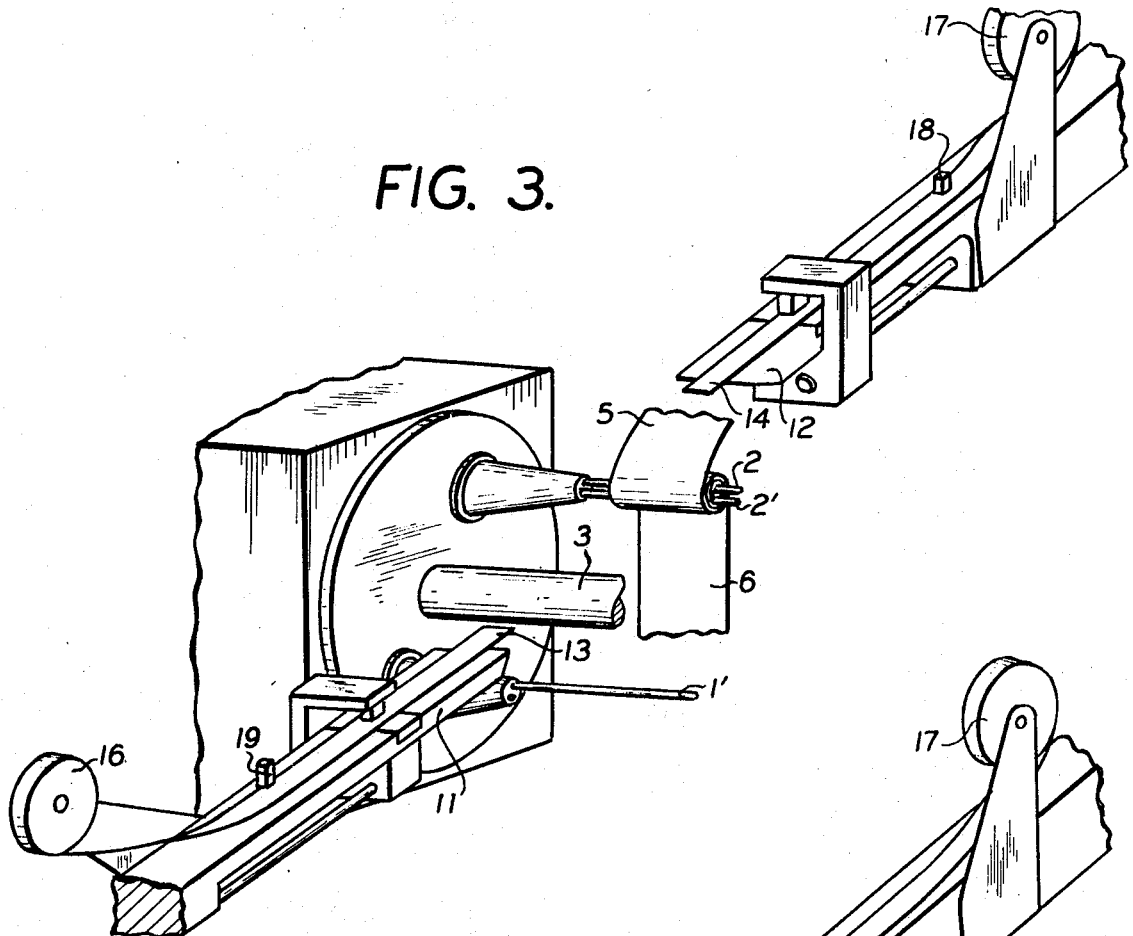

Each group 11 and 12 is substantially identical. Each one serves to introduce into the capacitor a metal foil band or strip, in particular aluminium, on which a suitably shaped terminal has been previously connected as by electrical welding. The means for stamping and welding the terminals will be described subsequently. As shown in FIG. 3, the two carriages 11 and 12 each have an upper planar surface which supports the aluminium foil band 13 or 14 which are supplied from the band rolls 16 and 17. Each carriage 11 and 12 is supplied with a sliding brushlike contact 19 and 18, respectively, which is connected with the bridge 53 for measuring capacitance of the capacitor being wound.

Each carriage group 11 and 12, by sliding on suitably fitting guides, can assume three different positions that, in succession, are: a terminal welding position, a position for foil introduction into the capacitor to be wound, and a foil cutting position. These positions are assumed in timed relation with the operations of the machine performed by the winding mandrels and have already been described and are controlled by solenoid valves E67 and E70.

In FIG. 3 the carriages are illustrated in the completely withdrawn terminal welding position. The carriages remain in this position during all phases already illustrated in FIGS. 2A, 2B, 2C, 2D, 2E and during this interval the terminals 20 and 21 are welded to the foils.

Figure 3A:
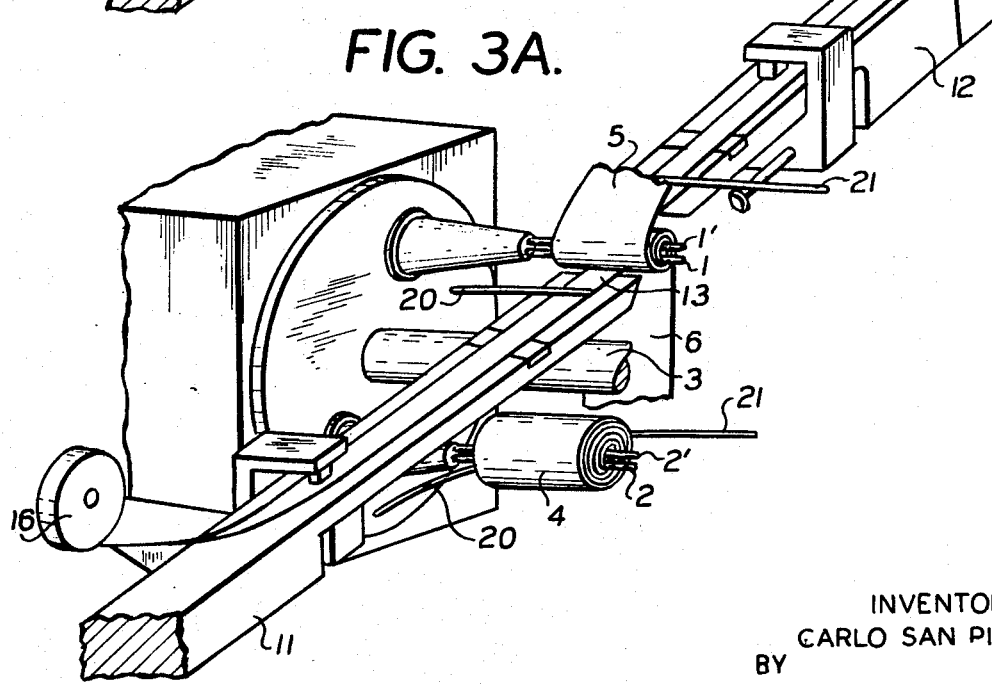

As shown in FIG. 3A, in correspondence with the phase already described in connection with FIG. 2F, the carriages are moved forward for introducing the foils in the capacitor winding after the formation of the dielectric core. Successively, as shown in FIG. 3B, the carriages are withdrawn to the cutting position and, when the capacitor 10 winding stops because bridge 53 indicates that capacitor 10 has reached the desired capacitance, the cutting tools 8–15, that cut the foils 13–14, are set into action in correspondence with the phases already described and illustrated in FIGS. 2G and 2H.

As it appears from FIG. 3C, in correspondence with the condition shown in FIG. 2L, the carriages are further withdrawn to the position for the terminal stamping, cutting and welding and are ready for the starting of a new cycle.

TERMINALS FEEDING, STAMPING, CUTTING AND WELDING GROUP D

This group D provides for the feeding, cutting and welding of the wire which is generally of copper or bronze covered with a tin-lead alloy and which is formed into the capacitor terminals 20 and 21. FIGS. 4 and 4A illustrate two views of a blade terminal prior to the welding thereof to the foil.

Figure 5A:
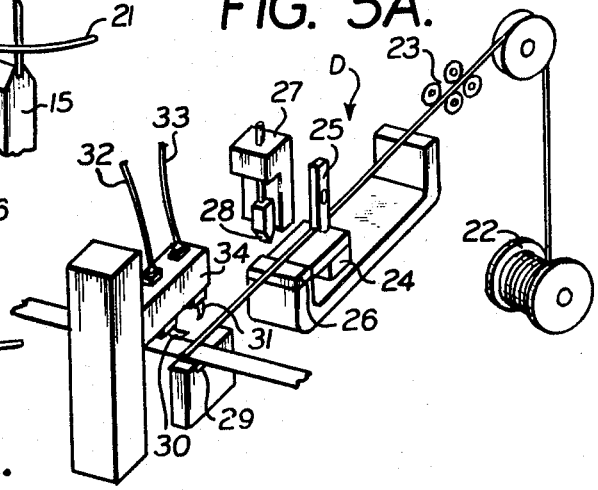
Figure 5B:
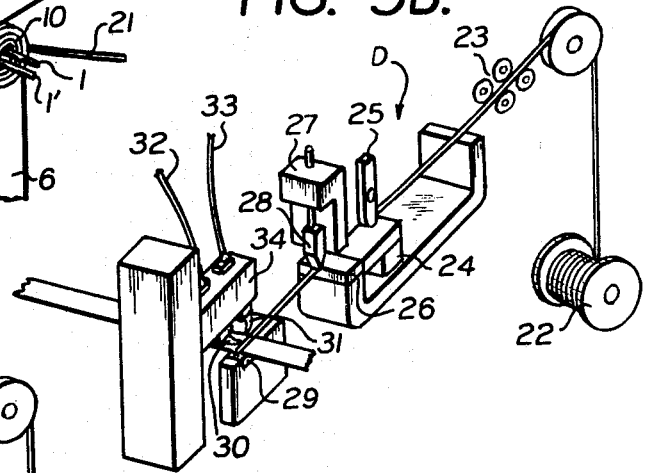
Figure 5:
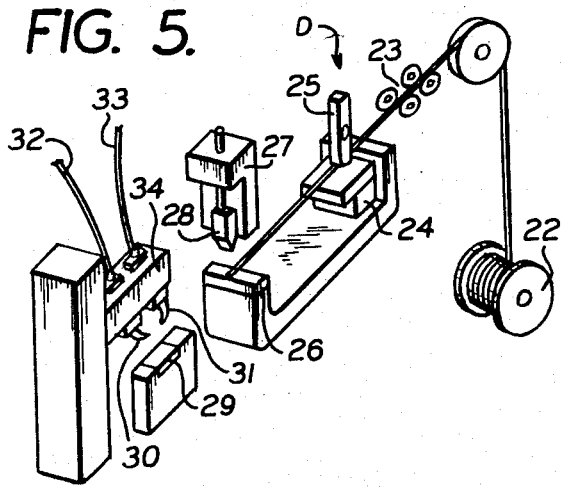

FIG. 5 illustrates one of the two identical groups D assembled on the machine. The terminal forming wire comes from a feed roll 22 and passes through a straightening apparatus 23 and an advancing carriage 24 provided with a one way motion device 25 which grabs and advances the wire when moving in one direction, while it slides freely over the wire when moving in the opposite direction. The wire lays on a stamping and cutting anvil 26 over which acts a stamping hammer 27 and a cutting knife 28. During the cutting phase, the associated foil holder carriages 11 or 12 moves under the foil a platen 29, of insulating hard material having a low thermal conductivity as is necessary as a support for the welding step (FIGS. 5C and 5D). An electrodes holder 34 supports and guides the welding electrodes 30–31 which are connected through the wires 32–33 to the welding machine clamps.

The different phases of the operations of the group D are illustrated in sequence in FIGS. 5 through 5D. In the condition shown in FIG. 5, the wire, already flattened, lays on the anvil 26. In the next phase of the operation as shown in FIG. 5A, the carriage 24 moves forward (to the left) for a distance equal to the length of a terminal to dispose the terminal in the welding position under the electrode 30–31. The advancement of the carriage 24 is subordinated to the welding position of the foil holder carriages 11 and 12.

A limit stop switch M80 on the carriage 24 controls different other movements as illustrated in FIG. 5B. The electrodes holder group 24 moves to the left until its limit stop device acts on the switch M80 which controls the welding current to the electrodes 30–31. The operation of switch M80 also causes the cutting knife 28 to then move down and cut the wire. The suitably shaped hammer 27 also drops down with knife 28 and stamps the terminal to the desired shape. As further shown in FIG. 5C, the limit stop switch M86 associated with the hammer 27 actuates the return or rightward movement of carriage 24, while wire is kept stationary by the hammer. Finally the limit stop switch M87 of the carriage 24 actuates the return to the raised or rest position of the hammer 27 and the knife 28 as well as of the electrodes 30–31, while the terminal now welded on the foil now moves with the foil. The whole set D is now ready for a new cycle. If the stamping and welding group of the terminal is eliminated, it is possible to effect the winding of the extended foils capacitors. The horizontal reciprocal movement of the carriage 24 is effected by a pair of matched pneumatic cylinders P77 supplied by a compressed air hose 77' which is in turn controlled by a solenoid valve E76. The vertical reciprocal movement of the hammer 27 and the knife blade 28 is imparted by a penumatic piston and cylinder P85 which is supplied with compressed air through a hose 85' that is controlled by a solenoid valve E84. From the foregoing description of the operation of the group D and its moving means, it would be obvious to those skilled in the art (as shown in FIGS. 1B and 1C) that solenoid valve E76 controlling the supply of air to piston cylinders P77 is controlled by limit switch M86, and solenoid valve E84 controlling piston cylinder 85 is in turn controlled by limit switches M86, 87 and M80.

MANDREL ROTATING MEANS

Figure 8:
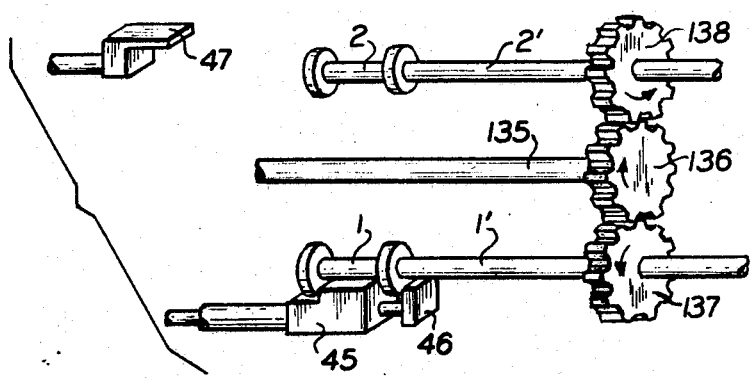

The mandrel rotating means is best illustrated in FIGS. 1, 6 and 8. Referring now to FIGS. 1 and 6, a motor 39 is mounted on the frame H of machine A and has an output shaft carrying a pulley wheel about which extends a belt 39', the other end of the belt extending around a second pulley wheel forming part of a conventional speed control or varying means 38. The output of the speed varying means 38 is a pulley wheel about which extends an endless belt 37, the other end of which extends around a pulley wheel forming the input to an electromagnetic clutch 36. A pulley wheel is secured to the output shaft of the electromagnetic clutch 36 and has extending thereabout an endless belt 36', the other end of which extends around a pulley wheel 141 which is fixed to the input of an electromagnetic brake 35. Secured to the output of the electromagnetic brake 35 is a shaft 135 on which is mounted a central spur gear 136 which is in meshed relation with two opposed spur gears 137 and 138 that are connected to the rotatable mandrel cones 201 and 202.

Assuming the electromagnetic clutch 36 to be energized and electromagnetic brake 35 to be de-activated, with motor 39 rotating, rotation will be imparted to the shaft 135 which will impart rotation to the meshed spur gears 136, 137 and 138 thereby rotating the cones 201 and 202 and their associated semi-mandrel pairs. However, when the clutch 36 is de-activated and the brake 35 is actuated there will be no rotation.

As best shown in FIGS. 1B and 1C the electromagnetic brake 35 and clutch 36 are controlled by the capacitance bridge 53 through a relay 98. Specifically, when the input from the brushes 18 and 19 to the capacitance bridge 53 indicates that specific capacitance of the capacitance being wound has been achieved, the output from the capacitance bridge 53 will cause relay 98 to operate whereby to energize the electromagnetic brake 35 and de-energize the electromagnetic clutch 36 to stop the winding of the capacitor being wound.

SEMI-MANDRELS POSITIONING GROUP

It will be apparent that the semi-mandrels will be stopped by the capacitance bridge 53 whenever the preselected value of capacitance is achieved which can happen in any relative position between semi-mandrels. In order to assure that the semi-mandrel 1' (FIG. 2A) is in the proper position for receiving the dielectric bands 5 and 6 for the next successive introduction thereof, it is necessary to operate the semi-mandrels to a particular angular position with respect to one another. To this end there is a positioning group shown in FIGS. 1 and 6 which includes a pin 40 that is insertable into a slot 41 of the brake-clutch pulley 141.

When pin 40 is so inserted, the semi-mandrels will be in the appropriate angular position for reception of the dielectric bands for the next capacitor to be formed.

The momentary brake-clutch shift necessary to free the mandrel for rotation to obtain the insertion of the pin is obtained through a cam C74 set into operation by the return movement of the foil holder carriages 11 and 12 and associated limit switch M73.

SEMI-MANDRELS EXTRACTION AND INTRODUCTION GROUP

The semi-mandrels are housed in mandrel-holders, the preferred shape of which is illustrated in FIG. 7. A mandrel holder is composed of a cylinder 42 in which is provided an elongated rectangular slot 43; another portion of the mandrel-holder is composed of a rectangular body 44 complementary to and slidably disposed in slot 43.

Figure 8A:
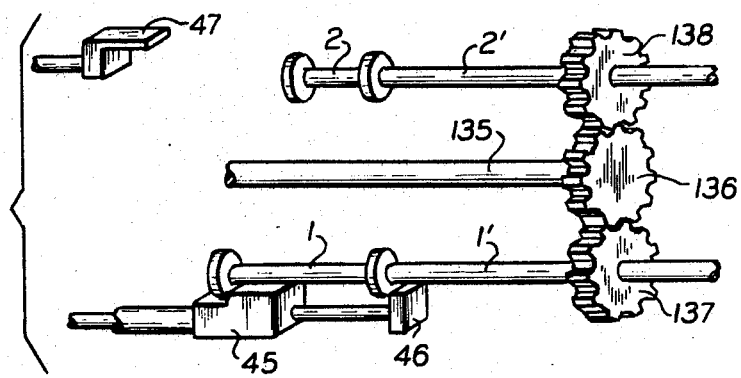
Figure 8B:
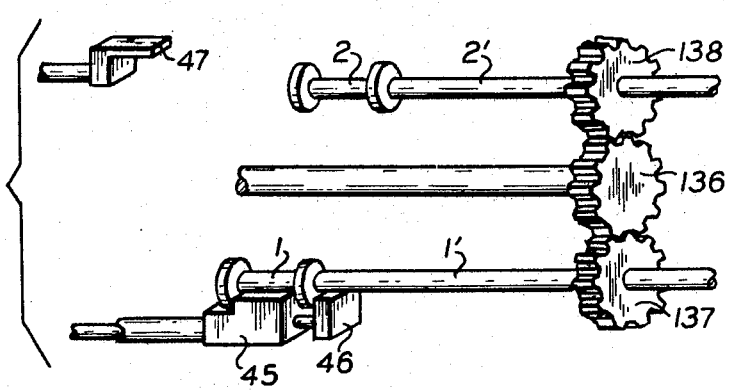

The mandrels extraction and introduction phases are best illustrated in FIGS. 8 through 8F as follows: As shown in FIG. 8A, when the predetermined capacitance is reached, the mandrels stop rotating and a tool 45 is immediately set in action for extracting the semi-mandrel 1 by actuation of piston cylinder P57 through operation of solenoid valve E56. A limit stop switch M62 actuated by the tool 45 is actuated by the withdrawal of the tool 45 and in turn actuates a tool 46 that extracts the semi-mandrel 1' as shown in FIG. 8B. The finished capacitor is released as shown in FIG. 2H.

Figure 8C:
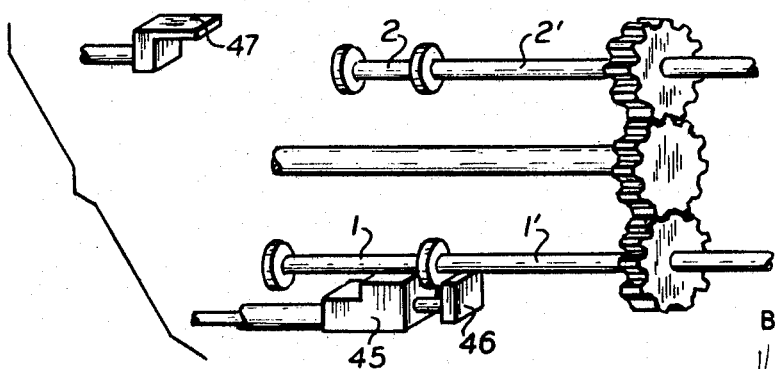

A limit stop switch M65 associated with the tool 46 is then operated and through solenoid valves E63 and E56 effects the return of the tools 45 and 46 to their original positions by reinserting the semi-mandrel 1' as shown in FIG. 8C. In the meanwhile the above described semi-mandrel positioning group is set in action to position the appropriate semi-mandrel for reception of the dielectric films 5 and 6. At this point (FIG. 8D) the mandrels commence rotating (FIG. 2B). Now the tool 47 is set in action again moving forward the semi-mandrel 1 (FIGS. 8E and 2C). As shown in FIG. 8F, the tool 47 is once again retracted and the semi-mandrels rotation is restarted.

TURRET POSITIONING MEANS F

The Turret Positioning Means F includes a reciprocably movable rack 50 which is driven by a piston and cylinder P79 that is supplied with compressed air through a hose 79' which is in turn controlled by a solenoid valve E78. In cooperative relation with the rack 50 is a pinion 51 which is mounted on the input shaft of a one way drive 52, the output of which is secured to the turret shaft 3. When the solenoid valve E78 is actuated to supply compressed air to piston P79, rack 50 will move to the right (as viewed in FIG. 1) to impart a counterclockwise movement to pinion 51 which movement through one way drive 52 will be imparted to shaft 3 and the mandrel turret 130. When the piston and cylinder P79 is operated to move the rack 50 to the left (as viewed in FIG. 1), pinion 51 will rotate in the clockwise direction but this motion will not be imparted to shaft 3 or turret 130 due to the lost motion in one way drive 52.

MACHINE OPERATION

The complete cycle of the machine operations is as follows: When a capacitor being wound achieves the preselected value of capacitance, the capacitance bridge, schematically designated by reference numeral 53 in FIG. 1B, whose input is connected to the contact brushes 18 and 19 (FIG. 1A) emits an electric signal to actuate relay 98 that in turn provides current to the electromagnetic brake 35 and cuts off current to the clutch 36, whereby to stop the rotation of the semi-mandrel pairs (FIG. 1). The same signal from bridge 53 acts on the solenoid of the valve E54 that controls the supply of compressed air through the hose 55' to the piston P55, that pushes the positioning pin 40 (FIGS. 1 and 6) into the slot 41 to properly position the semi-mandrels. Further, the same signal from bridge 53 acts on the solenoid of the valve E56 that controls the supply of compressed air to the piston P57 through hose 57' to move tool 45 so as to extract the semi-mandrel 1 or 2 (FIGS. 1 and 8A). The same signal from bridge 53 energizes solenoid valves E58 and E59 which, through the hoses 60' and 61', set into motion the pistons P60 and P61 at the ends of which are respectively connected the cutting tools 8 and 15 that cut the metal foils 13 and 14 (FIG. 2L).

The limit switch M62 associated with piston P57 and tool 45 (FIG. 8), that is the tool for extracting the semi-mandrel 1 or 2, acts on the valve E63 which, through the hose 64', actuates the piston P64 at the end of which is fixed the apparatus 47, by extracting the semi-mandrel 1' or 2' in order to expel the finished capacitor (FIG. 8B) previously described. The limit switch M65, that is responsive to the position of tool 46, is now in such a condition that the solenoids of the valves E56 and E63 are deenergized, thereby allowing the pistons P64 and P57 to effect the return of the tools 45 and 46 to their original positions to re-insert the semi-mandrel 1' or 2' by disengaging in the withdrawn position from the semi-mandrel 1 or 2 (FIG. 8C).

The limit switches M66 and M67 which are controlled by the positions of the tools 8 and 15, effect the return, by deenergizing the electro-valves M58 and M59, of the tools to their original position. During the return stroke, the tool 8 acts on the microswitch M68, which in turn, energizes solenoid valves E69 and E70 which through the hoses 71' and 72' act on the pistons P71 and P72, to effect the return of the foil-holder carriages 11 and 12 to the welding position (FIG. 3C).

During the movement of the carriage 12 on the microswitch M73 is operated by cam C74 to cause a momentary reversal of the brake 35 and the clutch 36 for the positioining of the semi-mandrel 1' or 2' in position to receive the dielectric film while the pin 40 is inserted.

Microswitches M74 and M75, which are positioned at the retraction limit of the foil-holder carriages 11 and 12, respectively, control (a) the energization of solenoid valve E76, which acts through hose 77' on the piston P77 (FIG. 1A) to effect the advancing of the feeding carriage 24 for the terminal forming wire; and (b) the energization of the solenoid valve E78, that acts through the hose 79' on piston P79, which imparts movement to the rack 50 to position the semi-mandrel pairs by rotating the mounting turret 130 180 degrees.

The wire feeding, cutting and stamping apparatus (FIG. 5) operates in the following way: The limit stop switch M80 of the carriage 24 controls the energization of solenoid valve E81, that, through the hose 82', sets in action the piston P82 to effect the lowering of the welding group 34. This group at the end of its descending stroke operates microswitch M83 that controls the group welding feeder 99; the welding feeder 99 supplies welding current to the electrode 30 and 31 to effect the welding of the terminal to the capacitor foil (FIG. 5B). The limit stop microswitch M83 also controls the energization of valve E84 that, in turn, through the hose 85', controls the supply of compressed air to piston P85 to which are connected the cutting tool 28 and the stamping tool 27.

The microswitch M86, placed at the stroke end of the piston P85, when operated will: (a) deenergize solenoid valve E75 to cause the return of the piston P79 to its original position; and, consequently, to move rack 50, after having moved outward to cause the turret 130 to rotate and produce the 180° shift in mandrel position, to the left, as viewed in FIG. 1 to return it to its original position; and (b) energize solenoid valve E89 that controls, through the hose 90', the piston 90 setting in action the holding tool 7 that prevents the unraveling of capacitor 4 (FIG. 2D); and (c) control the energization of solenoid valve E91 which, through the duct 92', controls the piston P92 extends and withdraws the semi-mandrel 1 or 2 (FIG. 8F) through the tool 47.

Tool 47 acts at the end of its stroke on the microswitch M93 to cause: (a) the deenergizing of the solenoid valve E91 that controls the movements of the piston P92 which extends and retracts the tool 47; (b) the deenergizing of the solenoid valve E54 which controls the piston P55 to effect the return of the mandrels pair positioning pin 40; and (c) the energizing of the solenoid valve E58 that, through the hose 60', sets in action the piston P60 so that the cutting tool 8 cuts the dielectric bands (FIG. 2D).

When tool 8 arrives at its stroke end position, it operates microswitch M66 to deenergize the solenoid valve E58 and its associated piston P60 to effect the return of the tool 8 to its original position. During the return stroke of tool 8, microswitch M68 is operated so that when the microswitches M74 and M75, placed on and controlled by the return of the foil-holder carriages 11 and 12, are activated by the withdrawal of carriages 11 and 12, solenoid valves E69 and E70 become energized to allow pistons P71 and P72 to be reoperated to effect once again the advancing of said carriages 11 and 12.

The foil-holder carriage 11, during its advancing stroke, acts on the microswitch M94 to deenergize brake 35 and energize clutch 36 so that the mandrels start to rotate before the foil-holder carriage 11 has reached the foil introduction position; this is done in order to obtain at the center of the capacitor a nucleus formed of only dielectric material (FIG. 2E).

The same microswitch M94 also causes the energization of solenoid valve E95, that acts through the hose 96' on the piston P96 that carries the sealing tool 9 into engagement with the wound capacitor. The contact time of the capacitor with the heated tool 9 is regulated through a timer symbolically indicated by the reference character T97 (FIG. 1B) which, after a regulated time, deenergizes the solenoid valve E95 to cause the piston P96 to retract and thereby withdraw the sealing tool 9. (It should be noted that the temperature of the heated sealing tool 9 is regulated by a thermostat in order to maintain it constant and at proper level). When the tool 9 is retracted, the timer T97 effects the return to the original position of the tool 7 as it deenergizes the solenoid valve E89 that controls the piston P90 through the hose 90'. The cycle is concluded and all will be repeated when the capacitance of the winding capacitor has reached the desired value.

In order to obtain capacitors with lower loss and lower inductance, it is possible to wind capacitors with the terminals welded on the foil bands at their midpoints by modifying the sequence of the machine movements. This type of operation is primarily desirable on capacitors having a long foils length. Practically this happens by altering the sequence of operation as will now be described.

The terminals welding on the foils will take place after the said foils will have commenced being wound. Accordingly, the mandrels will have to be stopped after a time measured by a timer T101 (FIG. 1C); this time will be selected to allow the terminal welding to occur near the mid-point of the foils length; and after the welding the mandrels will turn again and will stop upon the capacitor reaching the desired capacitance. The sequence of operations for such a cycle is as follows: When the capacitor being wound has reached the preselected value for its capacitance, the measurement bridge 53 in FIG. 1C, whose input is connected with the contact brushes 18 and 19 emits an electric signal and sets in action the relay 98 that energizes the electromagnetic brake 35 and deenergizes the clutch 36 to thereby stop the mandrels groups 1-2 and 1'-2' rotation (FIG. 1).

The same signal from the bridge 53 acts on the solenoid of the valve E54 that supplies compressed air through the hose 55' to the piston P55, that pushes the positioning pin 40 (FIGS. 1 and 6) into the slot 41; further the same signal energizes the solenoid of the valve E56 that supplies through the hose 57' compressed air to the piston P57 that moves the semi-mandrel 1 or 2 (FIGS. 1 and 8A) through the tool 45. The same signal actuates the valves E58 and E59 which, through the hoses 60' and 61', actuates the pistons, P60 and P61 at the ends of which are connected the cutting tools 8 and 15 that cut the metal foil bands 13 and 14 (FIG. 2L).

The limit stop microswitch M62 associated with piston P57 operates the valve E63 which, through the hose 64', actuates the piston P64 at the end of which is fixed the apparatus 47 for extracting the semi-mandrel 1' or 2' in order to expel the finished capacitor (FIG. 8B). The limit stop microswitch M65, that is operated by the tool 46, deenergizes the solenoids of the valves E56 and E63 to cause the pistons P64 and P57 to effect the return of the tools 45 and 46 to their original positions; these, in turn, reinsert the semi-mandrel 1' or 2' by disengaging in the withdrawn position from the semi-mandrel 1 or 2 (FIG. 8C). The limit stop microswitches M66 and M67, actuated by movement of the tools 8 and 15, effect the return of the tools 8 and 15 to their original positions by deenergizing the valves M58 and M59. During the return stroke of the tool 8, the tool 8 acts on the microswitch M68, which in turn energizes the valves E69 and E70 which, through the hoses 71' and 72', act on the pistons P71 and P72, to effect the return of the foil-holder carriages 11 and 12 to the welding positions (FIG. 3C). During the return movement of the carriage 12, it operates the microswitch M73 through the cam C74; and the operation of microswitch M73 causes a momentary deenergization of the brake 35 and a momentary energization of the clutch 36 for the positioning of the semi-mandrel 1' or 2', while the pin 40 is inserted in a slot 41.

The microswitches M74 and M75, positioned at the limit stop of the foil-holder carriages 11 and 12 cause the energization of the valve E78, which acts through the hose 79' on the piston P79 to move the rack 50 and thereby rotate 180° the turret 130 and the semi-mandrel pairs secured thereon.

The microswitch M88, placed to operate at the stroke end of piston P79 associated to the rack apparatus 50, determines: (a) the deenergizing of the valve E78 that effects the return of the piston P79 to its original position; consequently the rack 50, after effecting its outward stroke, and therefore after rotating the turret 130 to produce the shift of position of the semi-mandrel pairs, comes back to its original position; (b) the energizing of the valve E89 that controls, through the hose 90' the piston 90 to set into motion the holding tool 7 that prevents the capacitor 4 from unraveling (FIG. 2D); (c) the energization of the valve E91 which, through the hose 92', controls the piston P92 that extends and retracts the semi-mandrel 1 or 2 (FIG. 8F) through the tool 47, which in turn actuates the valve E91 at stroke end by operating the microswitch M93.

The operation of switch M93 causes: (a) the deenergizing of the valve E91 to effect the return of the piston P92 and the tool 47 carried thereby; (b) the deenergizing of the valve E54 which, controls the piston P55 to effect the return of the pin 40; and (c) the energizing of the valve E58 which, through the hose 60', sets in motion the piston P60 so that the cutting tool 8 cuts the dielectric bands (FIG. 2D).

When tool 8 arrives at its stroke end position, it acts on the microswitch M66 to deenergize the valve E58 and the piston P60 to effect the return of the tool 8 to its original position. In the return stroke of the tool 8, the microswitch M68 which, when the microswitches M74 and M75 controlled by the return of the foil-holder carriages 11 and 12 are activated (i.e., the carriages 11 and 12 are completely retracted), determines the energization of the valves E69 and E70 to actuate the pistons P71 and P72 and effect the advancing of the carriages 11 and 12. The foil-holder carriage 11, during its advancing stroke, acts on the microswitch M94, to deenergize brake 35 and the energize clutch 36 so that the mandrels start to rotate before that the foil-holder carriage 11 has reached the foil introduction position in order to obtain at the center of the capacitor the nucleus formed only of dielectric material (FIG. 2E).

The same microswitch M94 causes the energization of the valve E95, that acts through the duct 96' on the piston P96 which carries the sealing tool 9 to and from the wound capacitor in the lower turret position. The contact time of the capacitor to the heated tool 9 is regulated through a timer T97 (FIG. 1C) that, after a regulated time, deenergizes the valve E95, allowing the piston P96 to return and effect the withdrawal of the sealing tool 9. (As was previously noted, the temperature of the heated sealing tool 9 is regulated by a thermostat in order to maintain it constant.)

When the tool 9 is wtihdrawn, the timer T97 effects the return to the original position of the tool 7 as it deenergizes the valve E89 that controls the piston P90 through the hose 90'. In the meantime the foil-holder carriages 11 and 12 introduce into the winding the metal foils. After the introduction of the foil, valves E69 and E70 are deenergized as the microswitch M94 sets in action the timer T100 that, after a certain time, deenergizes the above mentioned valves. The pistons P71 and P72 effect therefore the withdrawal of the carriages 11 and 12 to the sealing position (FIG. 3). Upon reaching this position, the carriages 11 and 12 act on the microswitches M74 and M75, that in turn act the timer T101 which, after a certain predetermined time calculated to cause the machine to stop at about half length of the foils, causes the energization of the brake 35 and the deenergization of the clutch 36 so that the semi-mandrel pairs rotation stops.

At this point valve E88 becomes actuated to operate piston P79, through the hose 77′, and effect the advancing of carriage 24. Upon carriage 24 advancing, the limit stop microswitch M80 of the carriage 24 will operate to energize the valve E81 that, through the duct 82′, sets in action the piston P82 to effect the lowering of the welding group 34. This group at the end of its descending stroke operates the microswitch M83 that provides for the control to the welding feeder 99: the welding feeder 99 causes energy to be supplied to the electrodes 30 and 31, to effect the welding of the terminal to the capacitor foil (FIG. 5B). The limit stop microswitch M83 also energizes the valve E84 which in turn, through the hose 85′, controls the piston P85 to which are connected the cutting tool 28 and the stamping tool 27. The microswitch M86, which, due to its placement, is operated at the stroke end of the piston P85, deenergizes the valve E76 to effect the return of the piston P77 to its original position and thereby causes carriage 24 to retract.

Finally, the limit stop microswitch M87, which operates upon the return of carriage 24, deenergizes the valves E81 and E84, to effect the return to the original position of the pistons P82 and therefore of the tools 34, 28 and 27.

The complete cycle is thus ended and the machine then starts the manufacture of a new capacitor.

It will be recognized that various modifications may be made in the above described machine without departing from the present invention. Thus, for example, machine A can be arranged to construct capacitors wherein the foil-strips are extended beyond the dielectric strips 5 and 6 whereby to eliminate the need of the terminals. If this is done, then clearly there will be no need for the inclusion of the terminal forming, welding and cutting mechanisms D.

Similarly, while all of the reciprocable motion imparted to the various elements of the machine A have been described as pneumatic pistons and cylinders, it will be obvious that other types of moving means could be employed, such as, for example, hydraulic pistons and cylinders, electric motor driven racks and the like. Likewise, throughout the specification the connections between the solenoid valves and the pistons and cylinders have been termed "hoses." It will be obvious that the term hose is broadly used herein and any form of conduit means can be employed in practicing the present invention such as, for example, tubing and piping or the like.

While I have herein shown and described the preferred form of the present invention and have suggested modifications thereof, other changes and modifications may be made therein within the scope of the appended claims without departing from the spirit and scope of this invention.

What I claim is:

1. Automatic apparatus for making capacitors of the type formed by winding into a cylinder a pair of dielectric bands and a pair of interleaved metal foil bands, said apparatus comprising:
    a pair of elongated semi-mandrels in close confronting relation;
    means for rotating said semi-mandrels about their joint longitudinal axis;
    means for supplying said pair of dielectric bands to said pair of semi-mandrels for being wrapped thereabout by the rotation thereof;
    means for supplying said pair of foil bands to said semi-mandrels in interleaved relation with said dielectric bands for being wrapped about said pair of semi-mandrels by the rotation thereof;
    means for measuring the capacitance of a capacitor in formation, electric brake-clutch means for rendering effective and ineffective said semi-mandrel rotating means, means for actuating said electric brake-clutch means to render said rotating means ineffective upon said capacitance measuring means measuring a predetermined capacitance;
    continuous wire supply means for each foil band, means for stamping a portion of each of said wires into a terminal, means for cutting said terminal from the remainder of said wire, and means for welding said terminal to said foil bands.

2. The automatic apparatus of claim 1, wherein each of said pair of semi-mandrels is cantilevered from a support and is longitudinally movable relative thereto, and further comprising means for withdrawing one of said semi-mandrels for permitting the positioning of said dielectric bands on the exposed confronting surface of the non-withdrawn semi-mandrel, whereby when said withdrawn semi-mandrel is reextended, said dielectric bands pass between said confronting semi-mandrels and are conditioned to be wrapped thereabout by rotation thereof; and means for withdrawing both said semi-mandrels for discharging a wound capacitor therefrom.

3. The automatic apparatus of claim 2, further comprising means for measuring the capacitance of a capacitor in formation, electric brake-clutch means for rendering effective and ineffective said semi-mandrel rotating means, and means for actuating said electric brake-clutch means to render said rotating means ineffective upon said capacitance measuring means measuring a predetermined capacitance.

4. The automatic apparatus of claim 1, further comprising a second pair of elongated semi-mandrels in close confronting relation, means for rotating said second pair of semi-mandrels about their joint longitudinal axis, said second pair being parallel to said first pair and spaced therefrom, both said pairs being mounted on a turret rotatable about an axis parallel to and equidistant from the joint axes of rotation of said two pairs of mandrels, and means for periodically rotating said turret between two and only two positions about 180° apart.

5. The automatic apparatus of claim 4, wherein each of said semi-mandrels is cantilevered from said turret and is longitudinally movable relative thereto between an extended and a retracted position, and means for moving said semi-mandrels to and from said two positions.

6. The automatic apparatus of claim 5, further comprising means for positioning each of said semi-mandrels relative to its associated semi-mandrel in a predetermined relative position, comprising a member rotatable in unison with the rotation of said semi-mandrel pairs about their joint axes, said member having an arcuate slot therein, and a pin reciprocably movable into said slot when said semi-mandrels are in said predetermined relative position.

References Cited

UNITED STATES PATENTS

| | | | |
|---|---|---|---|
| 1,789,451 | 1/1931 | Rosaire et al. | 29—25.42 |
| 2,384,983 | 9/1945 | Weiss | 242—56 |
| 2,506,314 | 5/1950 | Nordberg | 242—56.1 |
| 2,828,846 | 4/1958 | Viguers et al. | 192—12.2 |
| 2,950,070 | 8/1960 | Thorson et al. | 242—56.1 |
| 2,992,730 | 7/1961 | Rayburn et al. | 29—25.42 |
| 3,201,056 | 8/1965 | Fanning | 242—56.1 |
| 3,208,567 | 9/1965 | Metzger | 192—12.2 |
| 3,227,388 | 1/1966 | Masini | 242—56.1 |
| 3,384,210 | 5/1968 | Klang | 192—12.2 |

JOHN F. CAMPBELL, Primary Examiner

R. B. LAZARUS, Assistant Examiner

U.S. Cl. X.R.

242—56.1